United States Patent
Imai et al.

(10) Patent No.: US 7,257,332 B2
(45) Date of Patent: Aug. 14, 2007

(54) OPTICAL TRANSMITTER AND ITS CONTROL METHOD

(75) Inventors: Keisuke Imai, deceased, late of Kawasaki (JP); by Shihori Imai, legal representative, Kawasaki (JP); Toru Yamazaki, Kawasaki (JP); Kakuji Inoue, Sapporo (JP); Setsuo Misaizu, Sapporo (JP); Yasunori Nagakubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 653 days.

(21) Appl. No.: 10/628,553

(22) Filed: Jul. 29, 2003

(65) Prior Publication Data
US 2005/0249444 A1 Nov. 10, 2005

(30) Foreign Application Priority Data
Jul. 30, 2002 (JP) .............................. 2002-221720

(51) Int. Cl.
*H04B 10/04* (2006.01)

(52) U.S. Cl. ...................... 398/198; 398/182; 398/183; 398/184; 398/186; 398/187; 398/188; 398/189; 398/192; 398/193; 398/194; 398/195; 398/196; 398/197; 398/199

(58) Field of Classification Search .............. 398/182, 398/183, 186, 184, 187, 188, 189, 192, 193, 398/194, 195, 196, 197, 198, 199
See application file for complete search history.

(56) References Cited

U.S. PATENT DOCUMENTS
2001/0007508 A1* 7/2001 Ooi et al. ................... 359/245

FOREIGN PATENT DOCUMENTS

| EP | 0 488 226 A3 | 6/1992 |
|---|---|---|
| EP | 0 877 495 A2 | 11/1998 |
| GB | 2 269 067 | 1/1994 |
| JP | 3-251815 | 11/1991 |
| JP | 5-142504 | 6/1993 |
| JP | 2642499 | 5/1997 |

* cited by examiner

*Primary Examiner*—Hanh Phan
(74) *Attorney, Agent, or Firm*—Staas & Halsey LLP

(57) ABSTRACT

An optical transmitter comprises an amplitude modulation unit performing amplitude modulation of only a one-side amplitude of a main signal with a low-frequency signal having a predetermined frequency. An optical modulator receives an input signal generated after the one-side amplitude modulation, and modulates an incoming light in response to the received signal in accordance with a predetermined modulation-characteristic curve to output an optical output signal. An operating point control unit applies a predetermined bias voltage to the optical modulator to control a level of the input signal substantially applied to the modulation-characteristic curve so that the one-side amplitude of the main signal is applied to a minimum portion of the modulation-characteristic curve of the optical modulator.

12 Claims, 15 Drawing Sheets

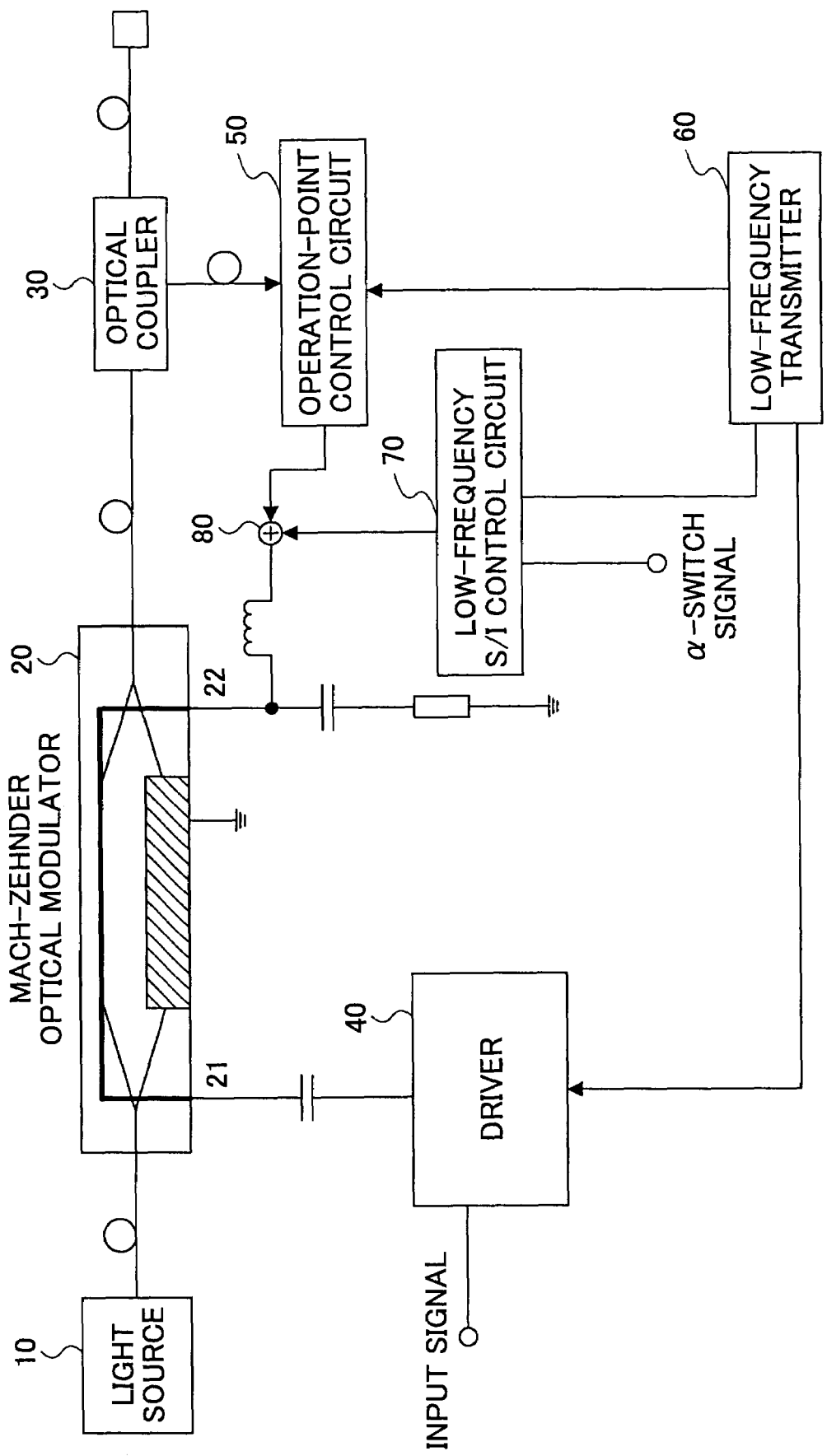

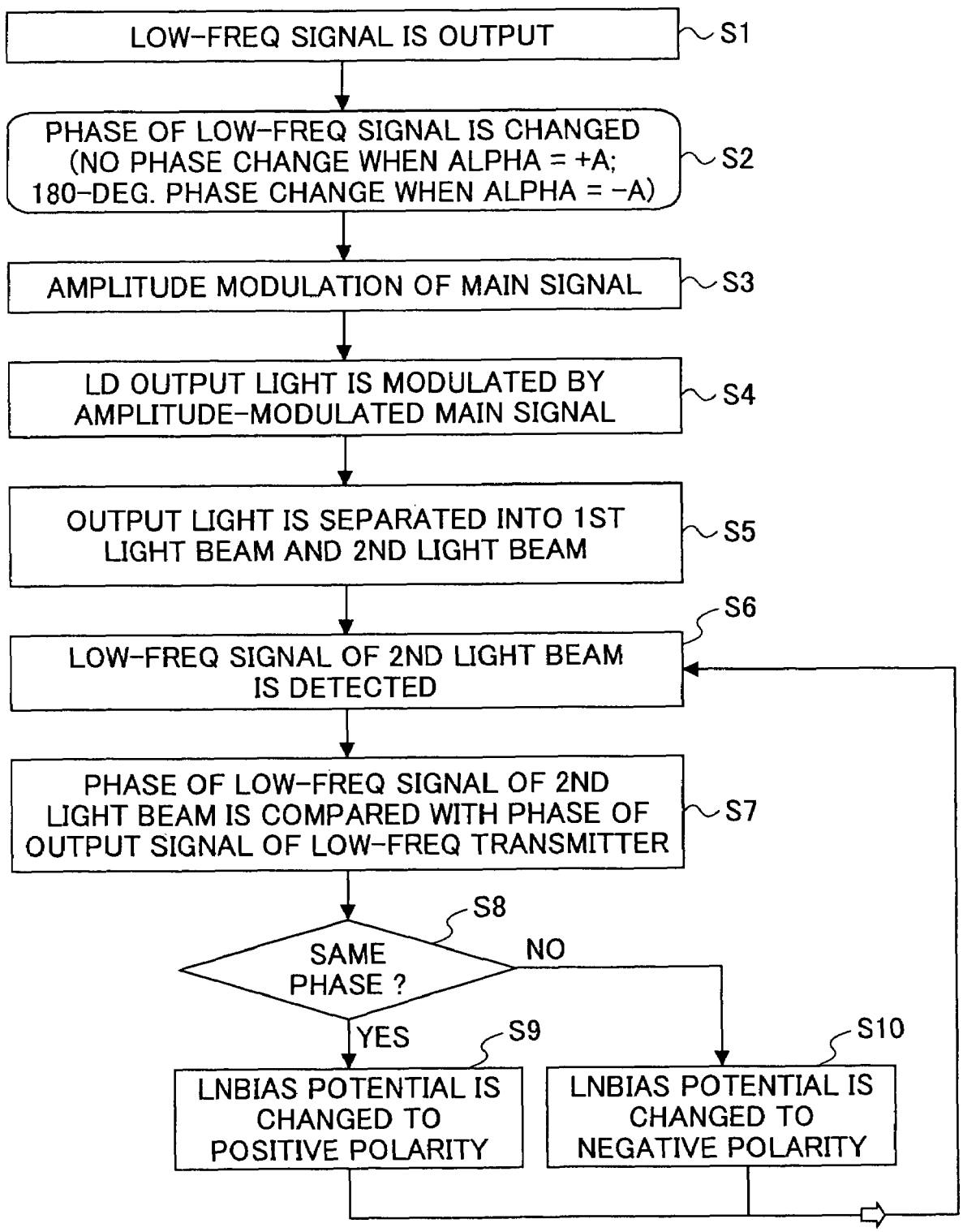

FIG.12A
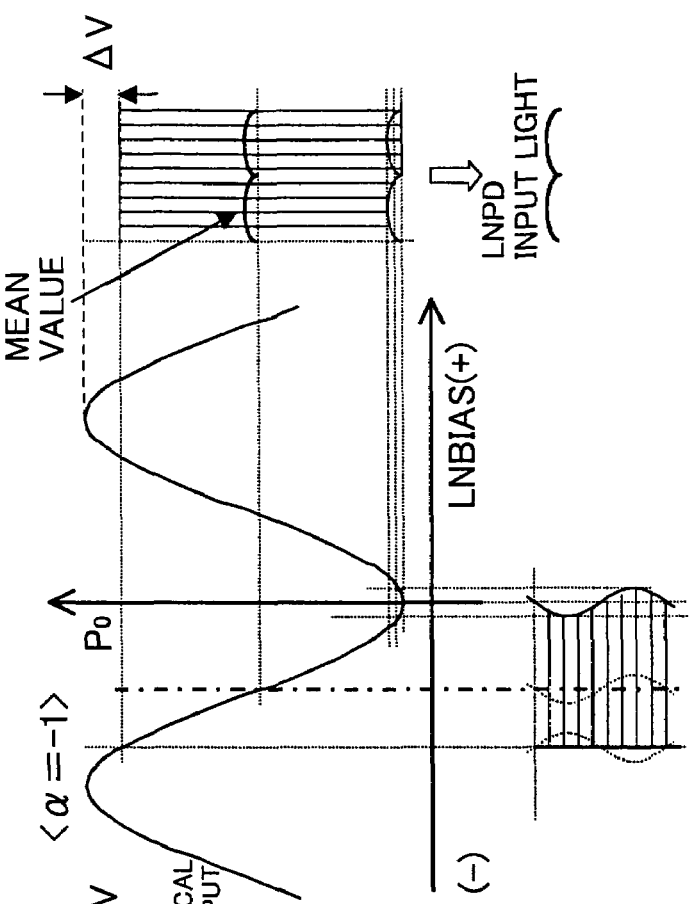
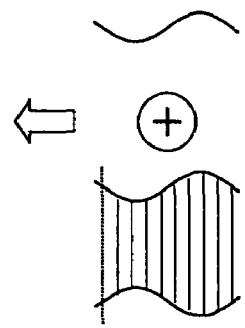
FIG.12B
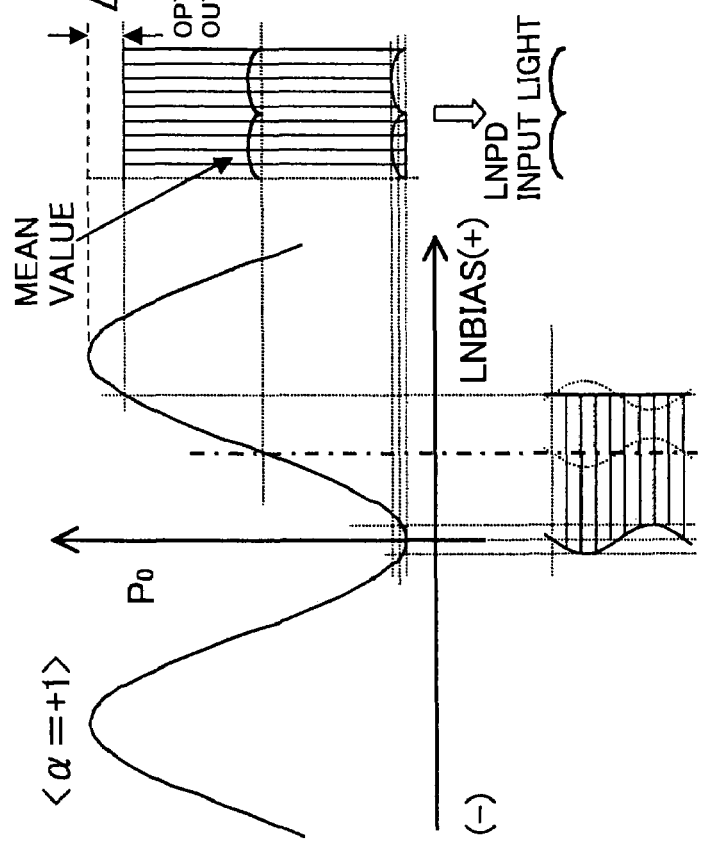
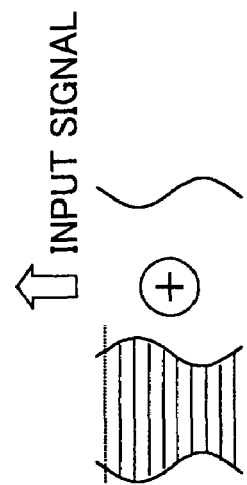

OPTICAL TRANSMITTER AND ITS CONTROL METHOD

CROSS-REFERENCE TO RELATED APPLICATIONS

This application is based upon and claims the benefit of priority from the prior Japanese patent application No. 2002-221720, filed on Jul. 30, 2002, the entire contents of which are incorporated herein by reference.

BACKGROUND OF THE INVENTION

1. Field of the Invention

The present invention relates to an optical transmitter provided with an optical modulator of, for example, Mach-Zehnder type, and a control method of the optical transmitter. More specifically, the present invention relates to an optical transmitter which is capable of effectively maintaining an extinction ratio of an optical modulator and improves the extinction ratio under given conditions, and a control method of the optical transmitter.

2. Description of the Related Art

As for an optical transmitter used for an optical communication system, a direct modulation method that modulates a drive current to be supplied to a semiconductor laser in accordance with a data signal is known.

However, if the direct modulation method is used, there is the tendency that the influences of dynamic wavelength variations (chirping) in the optical output signal of the optical transmitter become increasingly large due to the influences of the wavelength dispersion in the optical fiber as the transmission rate becomes high. Apparently, the direct modulation method is not suitable for long-distance transmission.

To eliminate the problem, the study has been carried out on the use of an optical transmitter provided with a Mach-Zehnder optical modulator which does not easily cause the chirping theoretically.

Even if there is damping of the transmission signal in the long-distance transmission, the maintenance of the extinction ratio is essential to the optical transmitter using the Mach-Zehnder optical modulator in order to attain the signal transmission with a predetermined level of precision.

FIG. 1 shows the composition of a conventional optical transmitter including a Mach-Zehnder optical modulator.

As shown in FIG. 1, a Mach-Zehnder optical modulator 20 receives the direct-current light from a LD (laser diode) light source 10. A driver circuit 40 drives the optical modulator 20 in response to the electric input signal which is externally supplied to the driver circuit 40, so that the optical modulator 20 transmits the optical output signal according to the input signal concerned.

FIG. 2 shows the composition of the Mach-Zehnder optical modulator in FIG. 1. FIG. 3 is a diagram for explaining the input/output characteristics of a Mach-Zehnder optical modulator.

As shown in FIG. 2, the Mach-Zehnder optical modulator is configured so that the input light from the light source is split into two light beams on the two optical waveguide paths. The voltage as the input signal is applied to the electrode on one of the two optical waveguide paths, and the Mach-Zehnder optical modulator outputs the optical output signal. The optical output signal which is output by the optical modulator is in accordance with the modulation-characteristic curve as shown in FIG. 3.

When the high-speed input signal is supplied as the applied voltage of the optical modulator, the high-speed optical output signal is obtained at the output of the optical modulator.

Hereinafter, the difference in voltage between the top (peak) and the bottom (valley) in the waveform of the input signal to the Mach-Zehnder optical modulator which is capable of using a maximum range of the modulation characteristic curve will be referred to as $V\pi$ (FIG. 3).

As indicated in FIG. 3, the extinction ratio EX mentioned above is represented by a value derived from the ratio of the maximum value VH to the minimum value VL in the waveform of the optical output signal of the optical modulator. Namely, the extinction ratio EX is represented by the following formula.

$$EX = 10 \times \log VH/VL \text{[dB]}$$

When the value of the extinction ratio EX becomes poor (small), it indicates that the optical-transmission characteristics will deteriorate. Moreover, the extinction ratio EX tends to become poor (small) due to the inter-symbol interference when the bit rate becomes large.

SUMMARY OF THE INVENTION

An object of the present invention is to provide an improved optical transmitter in which the above-described problems are eliminated.

Another object of the present invention is to provide an optical transmitter that is capable of stably supplying the optical output signal by maintaining the extinction ratio of the optical modulator even when the amplitude fluctuation of the incoming optical signal occurs due to operating point drifting, temperature changes or secular changes.

Another object of the present invention is to provide a control method of an optical transmitter that is capable of stably supplying the optical output signal by maintaining the extinction ratio of the optical modulator even when the amplitude fluctuation of the incoming optical signal occurs due to operating point drifting, temperature changes or secular changes.

The above-mentioned objects of the present invention are achieved by an optical transmitter comprising: an amplitude modulation unit performing amplitude modulation of only a one-side amplitude of a main signal with a low-frequency signal having a predetermined frequency; an optical modulator receiving an input signal generated after the one-side amplitude modulation, and modulating an incoming light in response to the received signal in accordance with a predetermined modulation-characteristic curve to output an optical output signal; and an operating point control unit applying a predetermined bias voltage to the optical modulator to control a level of the input signal substantially applied to the modulation-characteristic curve so that the one-side amplitude of the main signal is applied to a minimum portion of the modulation-characteristic curve of the optical modulator.

The above-mentioned objects of the present invention are achieved by a control method of an optical transmitter provided with an optical modulator, comprising: performing amplitude modulation of only a one-side amplitude of a main signal with a low-frequency signal having a predetermined frequency; causing the optical modulator to receive an input signal generated after the one-side amplitude modulation, and modulate an incoming light in response to the received signal in accordance with a predetermined modulation-characteristic curve to output an optical output signal; and applying a predetermined bias voltage to the optical modulator to control a level of the input signal substantially applied to the modulation-characteristic curve so that the one-side amplitude of the main signal is applied to a minimum portion of the modulation-characteristic curve of the optical modulator.

In the optical transmitter of the present invention, when the amplitude of the input signal to the optical modulator is decreased by a certain factor, the level of the input signal to the optical modulator is substantially adjusted so that the predetermined one-side amplitude of the input signal may be applied to the minimum portion of the modulation-characteristic curve of the optical modulator. The optical output signal is generated at the output of the optical modulator by mainly using the lower portion of the modulation-characteristic curve concerned. Therefore, it is possible for the optical transmitter of the present invention to maximize under the given conditions the extinction ratio of the optical modulator that is represented by a value derived from the ratio of the maximum value (peak) to the minimum value (valley) in the waveform of the optical output signal of the optical modulator.

According to the optical transmitter of the present invention, only a one-side amplitude of the input signal to the optical modulator is taken as being the signal portion where the amplitude modulation is carried out, and the level of the input signal applied to the modulation-characteristic curve is controlled so that the single side of the amplitude of the input signal concerned may be applied to the minimum portion of the modulation-characteristic curve of the optical modulator.

Consequently, even when the amplitude of the input signal to the optical modulator is decreased due to a certain factor, the optical transmitter of the present invention makes effective use of the minimum portion of the modulation-characteristic curve, and it is possible to maximize the extinction ratio under the given conditions.

BRIEF DESCRIPTION OF THE DRAWINGS

Other objects, features and advantages of the present invention will be apparent from the following detailed description when read in conjunction with the accompanying drawings.

FIG. 4 is a block diagram of an optical transmitter in the first preferred embodiment of the present invention.

FIG. 5 is a flowchart for explaining an operating point control operation of the optical transmitter of the present embodiment.

FIG. 12A and FIG. 12B are diagrams for explaining the operating point control operation of the optical transmitter of the present embodiment.

DETAILED DESCRIPTION OF PREFERRED EMBODIMENTS

A description will now be given of preferred embodiments of the present invention with reference to the accompanying drawings.

FIG. 4 shows the composition of an optical transmitter in the first preferred embodiment of the present invention.

As shown in FIG. 4, the optical transmitter of the present embodiment includes a light source 10 which emits a laser beam, a Mach-Zehnder optical modulator 20, and a driver circuit 40 which supplies a driving signal according to the input signal to one terminal 21 of the electrodes of the Mach-Zehnder optical modulator 20. The input signal is supplied to the optical modulator 20 via the driver circuit 40 from an external device (not shown).

Figure 1:
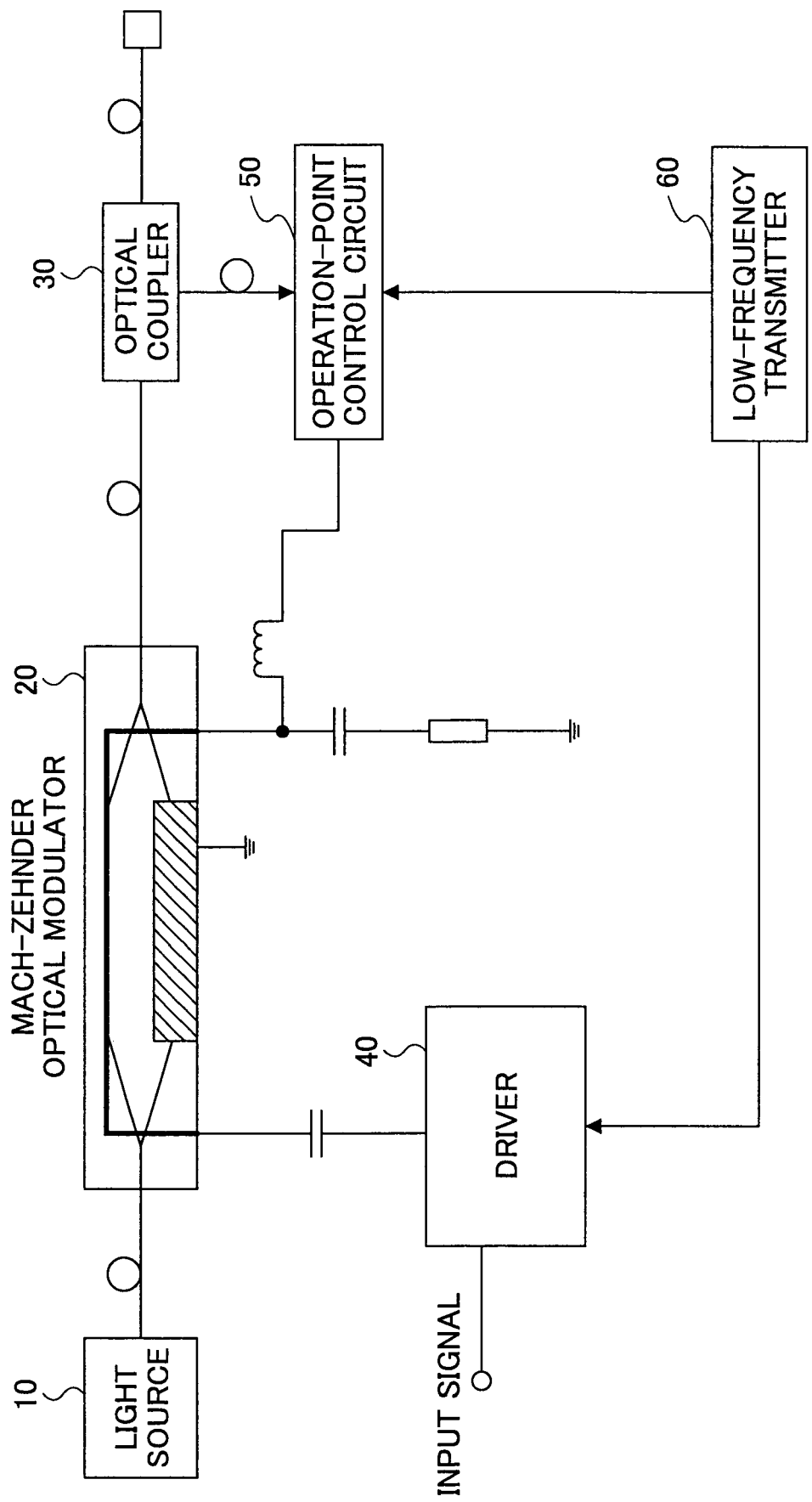
FIG. 1 is a block diagram of a conventional optical transmitter.
Figure 2:
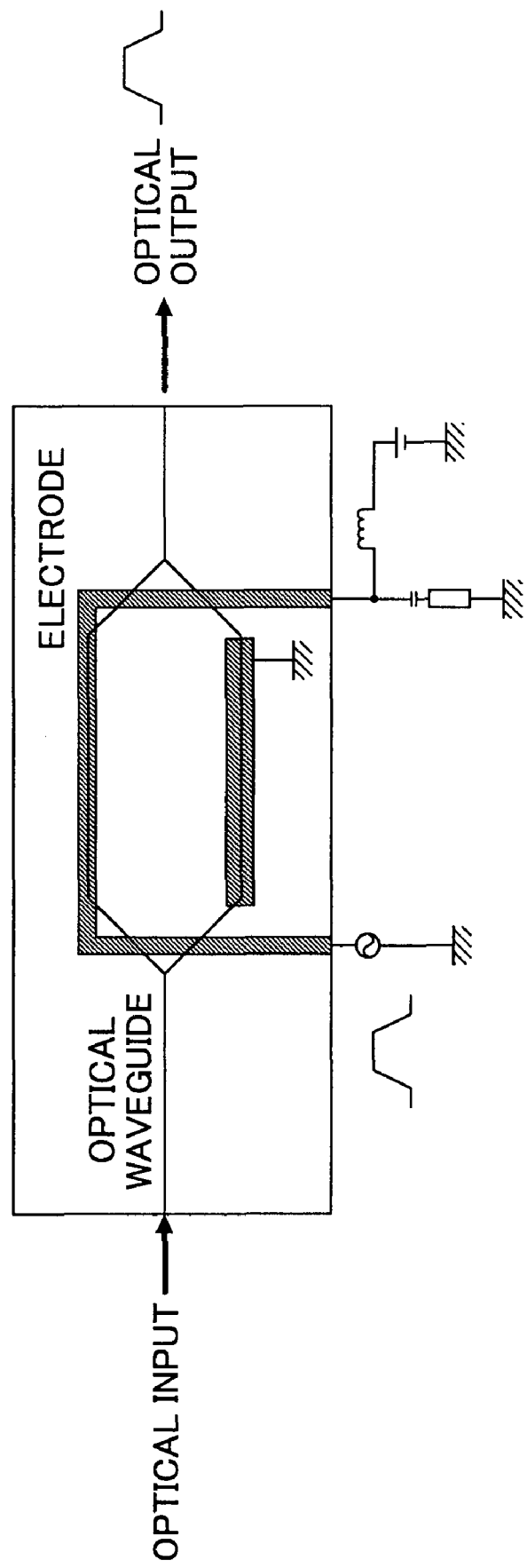
FIG. 2 is a diagram showing the composition of a Mach-Zehnder optical modulator in FIG. 1.
Figure 3:
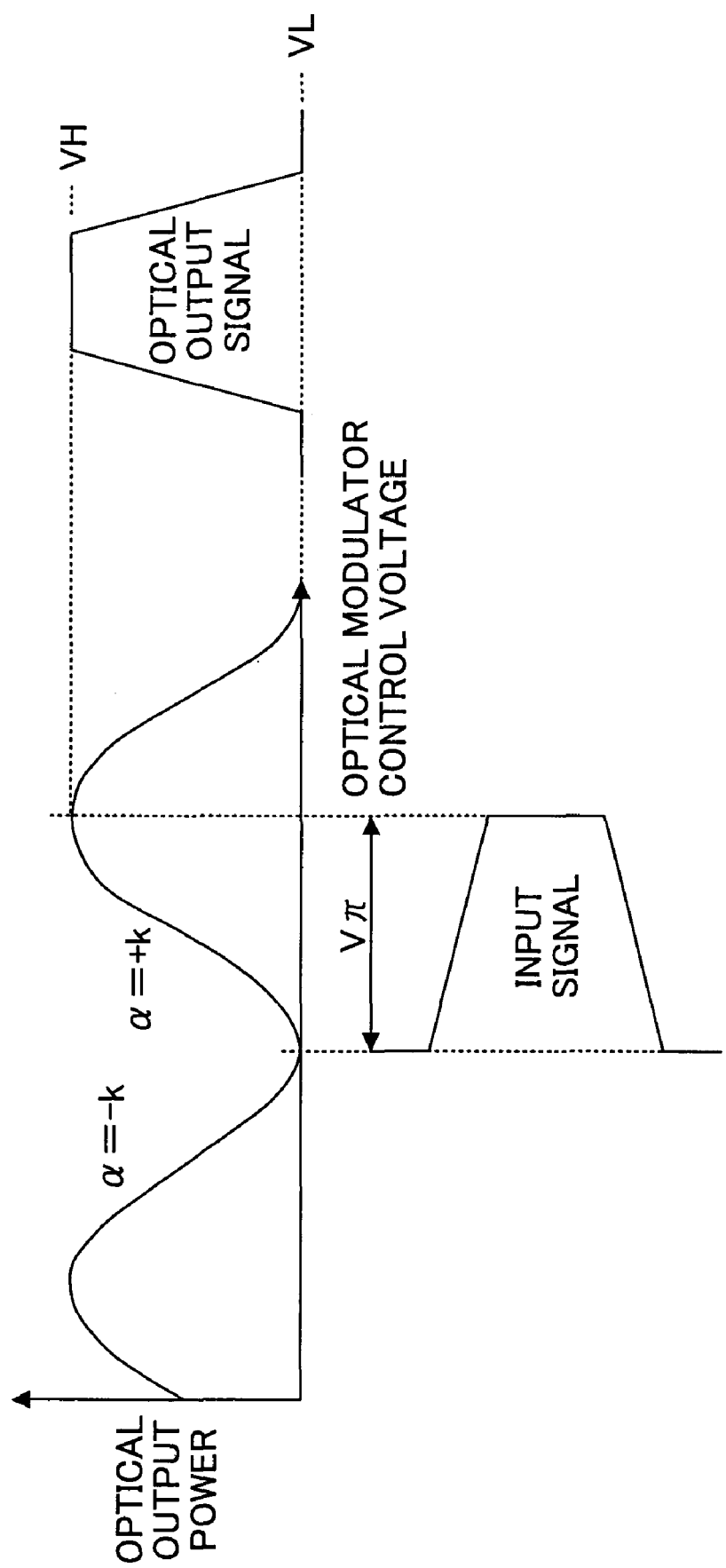
FIG. 3 is a diagram for explaining the input/output characteristics of a Mach-Zehnder optical modulator.

The Mach-Zehnder optical modulator 20 modulates the laser beam emitted by the light source 10, in response to the input signal (the transmission signal) received via the driver circuit 40, in accordance with a predetermined modulation-characteristic curve of the optical modulator as shown in FIG. 3, and generates the corresponding optical output signal.

The optical output signal generated by the optical modulator 20 is transmitted to a distant optical receiver (not shown) through the optical fiber.

The optical transmitter of FIG. 4 includes a low-frequency transmitter 60 which generates a low-frequency signal having a predetermined frequency f0, and this low-frequency signal is supplied to the driver circuit 40 for operating point control.

For example, the frequency f0 of the low-frequency signal for operating point control is set to 1 kHz when the carrier frequency of the transmission signal is in a range exceeding 40 kHz. Namely, the frequency which is considerably low when compared with the carrier frequency of the transmission signal is used as the frequency f0 of the low-frequency signal for operating point control. In the driver circuit 40, the low-frequency signal for operating point control is further superimposed on the driving signal which is generated by the driver circuit 40 according to the input.

The optical transmitter of FIG. 4 further includes an optical coupler 30 and an operating point control circuit 50. The optical coupler 30 serves to split the optical output signal of the optical modulator 20 into two optical signals. One of the two optical signals is inputted to the operating point control circuit 50. The operating point control circuit 50 receives the low frequency signal for operating point control which is generated by the low frequency transmitter 60. The operating point control circuit 50 performs an operating point control which will be described later.

As a result of the operating point control, the operating point control circuit 50 applies a bias voltage for operating point control to another terminal 22 of the electrodes of the Mach-Zehnder optical modulator 20. In the optical transmitter of FIG. 4, the output signal of the operating point control circuit 50 and the output signal of a low-frequency superimposing control circuit 70 are combined together at an AND gate 80, and the resulting signal is applied to the terminal 22 of the optical modulator 20.

Furthermore, the optical transmitter of FIG. 4 includes the low-frequency superimposing control circuit 70. Operation of the low-frequency superimposing control circuit 70 will be explained later together with a description of operation of the optical transmitter of the present embodiment which follows.

Next, a description will be given of the basic functions of the operating point control circuit 50 in the optical transmitter of the present embodiment with reference to FIG. 5 through FIG. 7C.

Figure 6A:
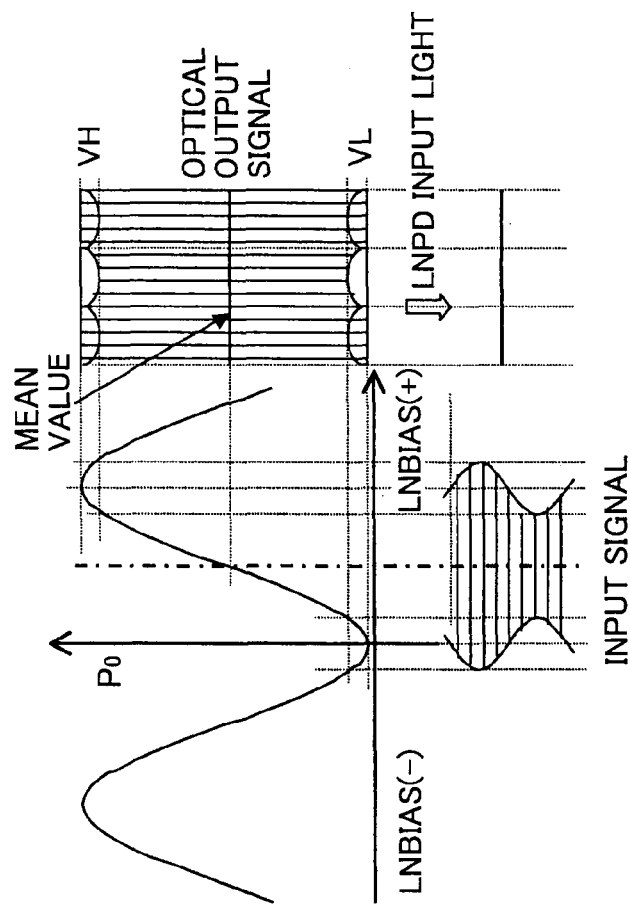
FIG. 6A and FIG. 6B are diagrams for explaining the operating point control operation of the optical transmitter of the present embodiment.
Figure 6B:
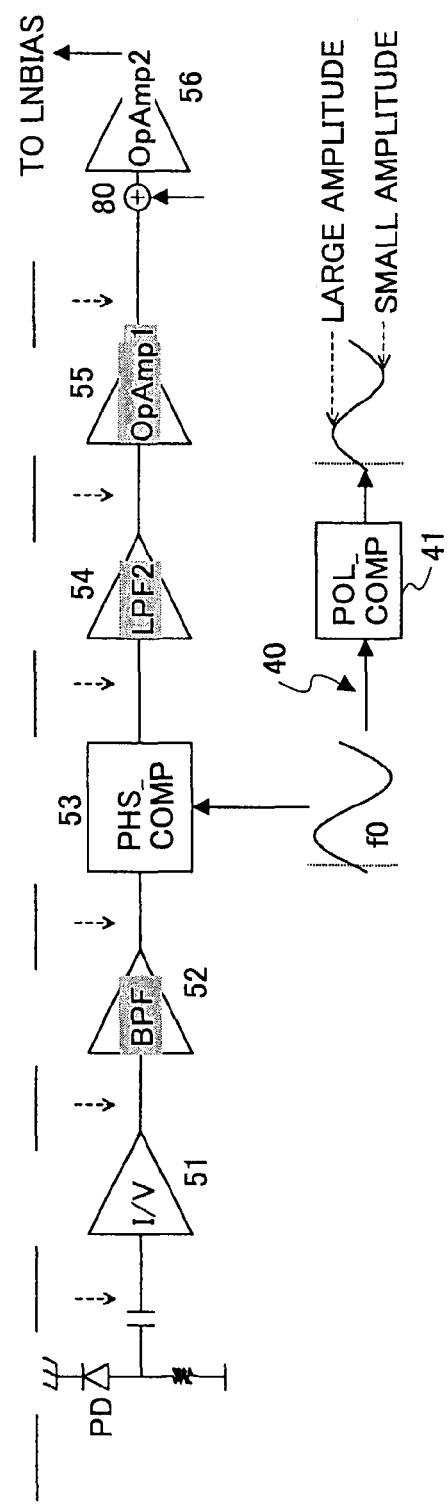
Figure 7A:
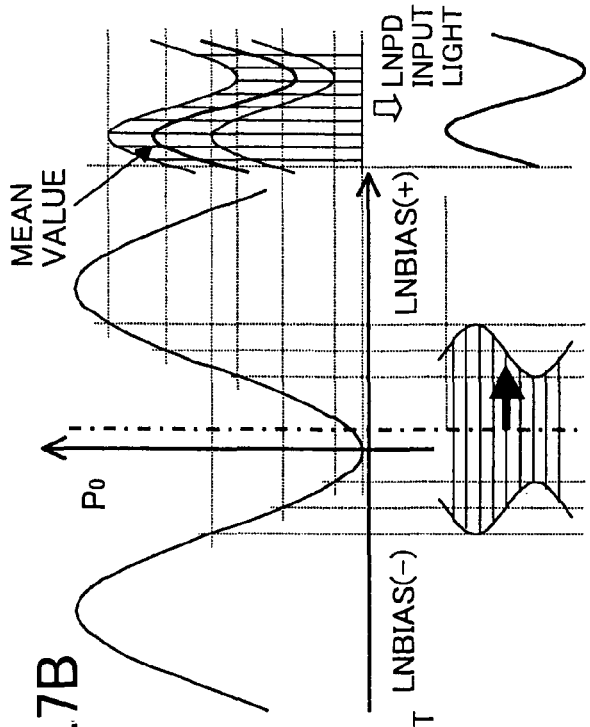
FIG. 7A, FIG. 7B and FIG. 7C are diagrams for explaining the operating point control operation of the optical transmitter of the present embodiment.
Figure 7B:
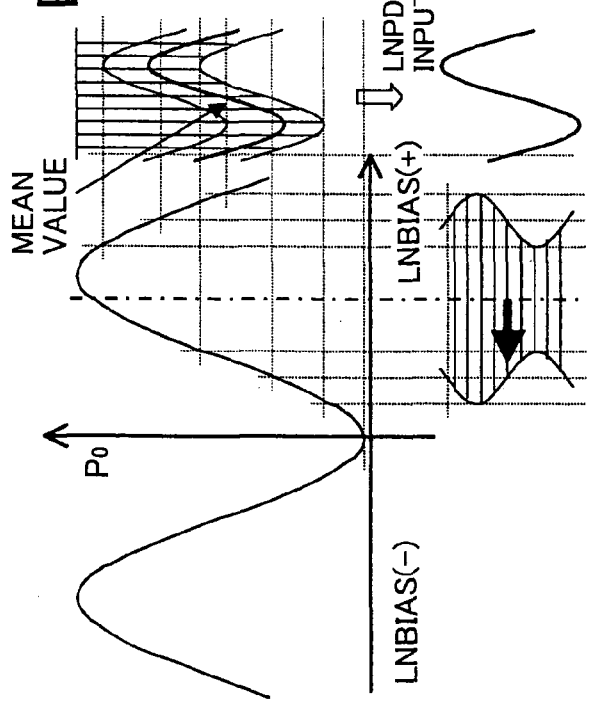
Figure 7C:
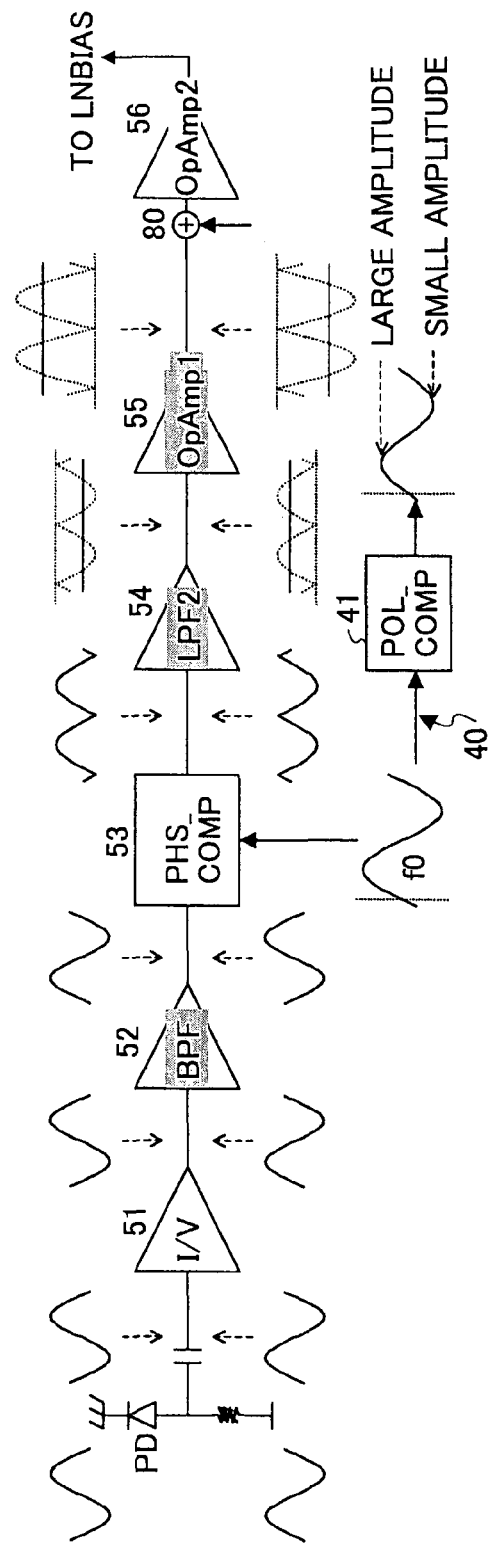

FIG. 5 is a flowchart for explaining the operating point control operation of the operating point control circuit 50. FIG. 6A is a diagram for explaining the operating point control operation, and FIG. 6B is a block diagram of the operating point control circuit 50 for explaining the same. FIG. 7A and FIG. 7B are diagrams for explaining the operating point control operation, and FIG. 7C is a block diagram of the operating point control circuit 50 for explaining the same.

In addition, the basic functions of the operating point control circuit 50 in the present embodiment are essentially the same as those in the external optical modulator control method disclosed in Japanese Laid-Open Patent Application No. 3-251815. Namely, similar to the composition as disclosed in the above document, the operating point control circuit 50 in the present embodiment serves to superimpose the waveform of a signal having a sufficiently low frequency onto the main signal in the upper and lower portions of the optical signal waveform. The amplitude of the resulting signal after the superimposing is detected by a monitoring photodetector, and the operating point control circuit 50 in the present embodiment serves to maintain the bias voltage applied to the Mach-Zehnder optical modulator at the optimal level.

The diagrams of FIG. 6A, FIG. 7A and FIG. 7B, each of which corresponds to the diagram of FIG. 3, are provided to explain the basic functions of the operating point control circuit 50. As shown in FIG. 6B and FIG. 7C, the operating point control circuit 50 in the present embodiment includes a photodetector (PD), a current-to-voltage converter (I/V) 51, a band-pass filter (BPF) 52, a phase comparator (PHS COMP) 53, a low-pass filter (LPF2) 54, an operational amplifier (OpAmp1) 55, and an operational amplifier (OpAmp2) 56. In addition, the driver circuit 40 in the present embodiment includes a polarity comparator (POL COMP) 41.

In the control operation of FIG. 5, at step S1, the low frequency signal is generated by the low frequency transmitter 60. At step S2, the low frequency superimposing control circuit 70 is caused to change the phase of the low frequency signal according to the alpha value inputted by the alpha-switch signal in FIG. 4. When the alpha value is negative, the phase of the low frequency signal is reversed 180 degrees. Otherwise the phase of the low frequency signal remains unchanged.

Figure 11A:
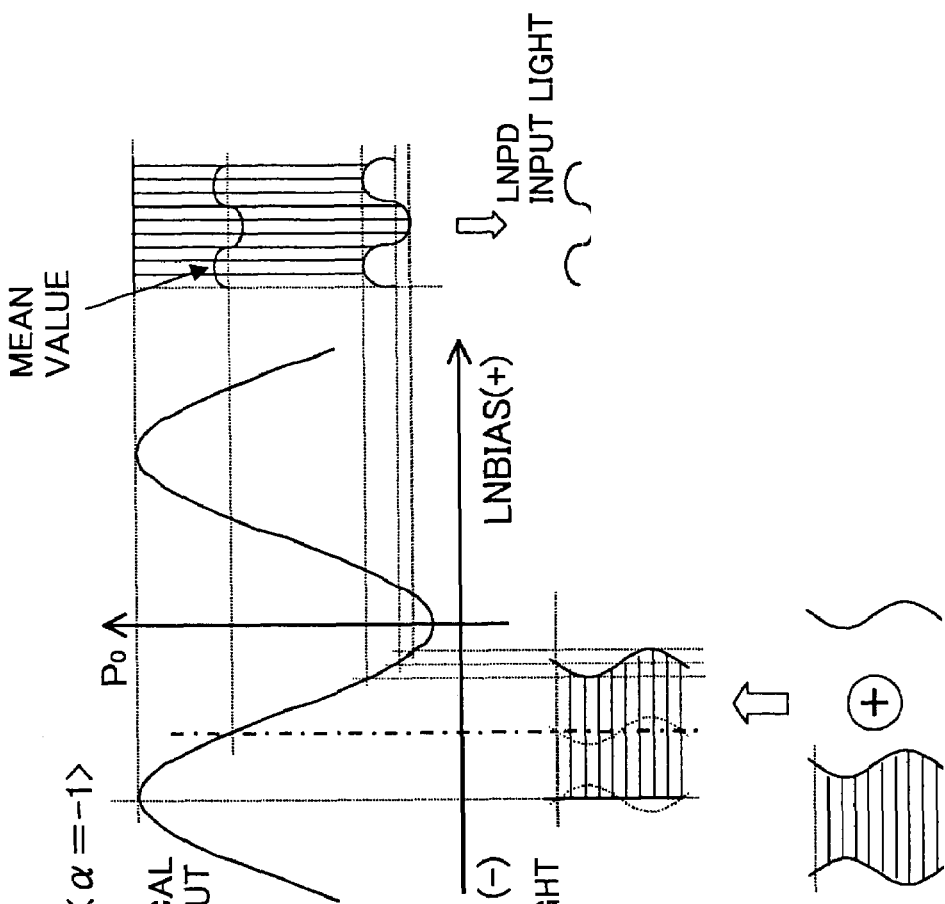
FIG. 11A and FIG. 11B are diagrams for explaining the operating point control operation of the optical transmitter of the present embodiment.
Figure 11B:
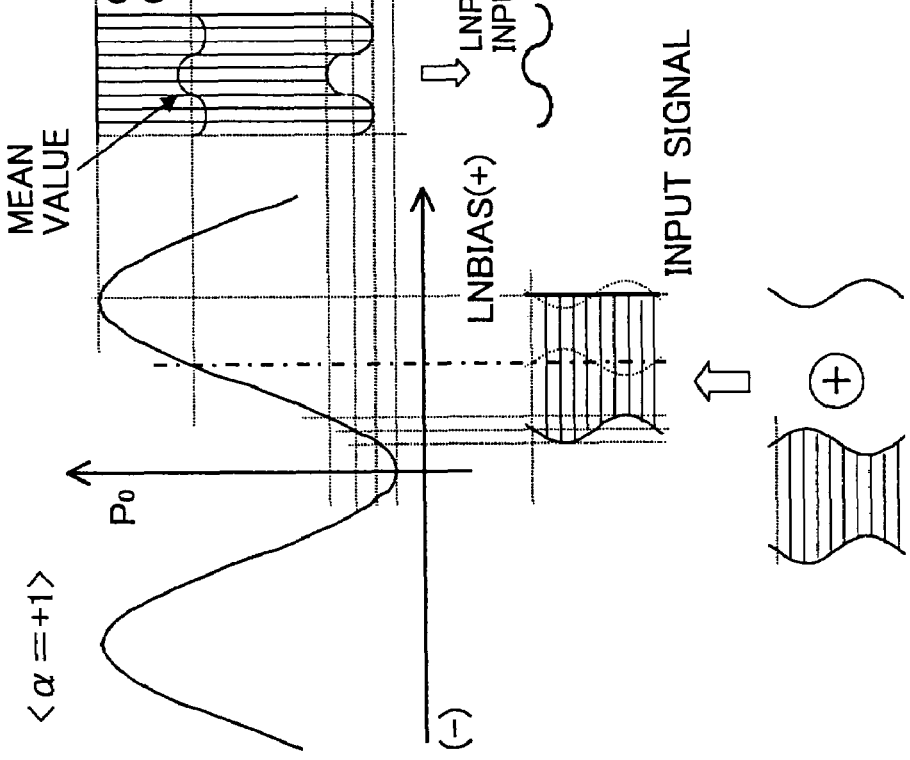

This alpha-switch signal is a signal for applying selectively the upward or downward slope portion of the modulation-characteristic curve of the optical modulator 20 as indicated in FIG. 11A and FIG. 11B. Specifically, when the alpha value is positive, the upward slope portion of the modulation-characteristic curve of the Mach-Zehnder optical modulator 20 is selected. When the alpha value is negative, the downward slope portion of the modulation-characteristic curve of the optical modulator 20 is selected.

Although the absolute value of the alpha indicated by the alpha-switch signal is a numeric value in connection with control of the optical transmitter of the present embodiment, it is not related directly to the subject matter of the present invention, and a description thereof will be omitted.

Next, at step S3, the amplitude modulation (superimposing) of the transmission signal (the main signal) with the low frequency signal is carried out. That is, as shown in FIG. 6B, the polarity comparator 41 in the driver circuit 40 detects the polarity of the waveform of the low-frequency signal of f0 generated by the low frequency transmitter 60. When the positive portion of the low-frequency signal of f0 is detected, the amplitude of the transmission signal is increased. When the negative portion of the low-frequency signal of f0 is detected, the amplitude of the transmission signal is decreased.

Furthermore, at step S4, the light from the light source 10, which is a laser diode, is modulated at the Mach-Zehnder optical modulator 20 by receiving the input signal after the amplitude modulation (after the superimposing).

At step S5, the optical output signal of the Mach-Zehnder optical modulator 20 is split by the optical coupler 30 into two optical signals (first and second light beams), one of the two (the first light beam) is outputted as an optical output of the optical transmitter, and the other (the second light beam) is inputted to the photodetector (PD) of the operating point control circuit 50. For this reason, the optical output signal of the optical modulator 20 is equivalent to the optical input signal of the photodetector (LNPD INPUT LIGHT).

As shown in FIG. 6A, when the input signal on which the low frequency signal of f0 from the low frequency transmitter 60 through the driver circuit 40 is superimposed is located at the optimum point of $V\pi$, the top and bottom portions in the waveform of the input signal after the superimposing are exactly applied to the top and bottom portions of the modulation characteristic curve of the Mach-Zehnder optical modulator 20.

Therefore, the low-frequency signal component of the optical output signal becomes the waveform of half-wave rectification of the signal having the frequency f0, and the average of the optical output signal is fixed to one half of the level of the voltage difference (VH−VL).

Consequently, in the operating point control circuit 50 of FIG. 4, the detection signal of the optical signal (the second light beam) supplied from the optical coupler 30 and detected (step S6) by the photodetector (PD) is in the flat waveform as shown in FIG. 6B. This signal passes through the current-to-voltage converter 51 and the band pass filter 52, and the phase comparison is carried out by the phase comparator 53 with the output waveform of the low frequency transmitter 60 of the frequency f0 (step S7).

The output signal of the band pass filter 52 which is subjected to the comparison is in the flat waveform, and the output signal of the phase comparator 53 is in the flat waveform and set to the zero level. The output signal of the phase comparator 53 passes through the low pass filter 54, the amplifier 55, and the amplifier 56, respectively, and it is supplied to the terminal 22 of the electrodes of the Mach-Zehnder optical modulator 20.

In this case, the bias voltage applied to the Mach-Zehnder optical modulator 20 does not change substantially. Therefore, the control operation following step S8 is not performed, but the control is returned to the step S6. In this case, the operating point where the input signal is applied to the modulation-characteristic curve of the modulator 20 remains unchanged.

In addition, the phase comparator 53 performs the processing which multiplies both the signals in consideration of the sign regardless of the DC component substantially. Consequently, regardless of the waveform of the low frequency signal of f0, the output signal of the phase comparator 53 is in the flat waveform, and set to the zero level.

On the other hand, suppose the case in which an operating point drift occurs due to a certain factor as shown in FIG. 7A, and the operating point is moved in the plus voltage direction from the optimum point. In this case, the top and the bottom of the waveform of the input signal are respectively applied to the downward slope portion and the upward slope portion of the middle of the modulation characteristic curve.

The optical output signal waveform will be distorted and the component of the low frequency signal of f0 will be detected as an average of the optical output signal waveform in the opposite phase with the original low frequency superimposed signal (180 degrees out of phase). Namely, the comparison of step S7 is performed, and the result of the determination of step S8 is negative.

Consequently, as in the waveform chart in the upper portion of FIG. 7C, the operating point control circuit 50 detects the component of the low frequency signal of f0, and the phase thereof is reversed by the band pass filter 52. The phase comparison with the phase f0 of the low frequency transmitter 60 performed by the phase comparator 53 indicates that both the signals are in phase.

The output signal waveform of the phase comparator 53 is changed to the waveform in which half wave rectification is performed in the right direction, and the signal will be equalized and reversed as a result of passing through the low pass filter 54, the amplifier 55 and the amplifier 56. Hence, the bias voltage in the minus direction is applied to the Mach-Zehnder optical modulator 20.

Consequently, as indicated by the arrow in FIG. 7A, the operating point where the input wave is applied is changed in the minus direction (step S10). The feedback control is performed so that the operating point is returned to the optimal position as shown in FIG. 6A.

In addition, both the signals are in phase by the phase comparator 53 in this case, as a result of multiplying mutually, the wave which always has the amplitude of only the right direction is outputted, and as a result of equalizing this and being reversed, it becomes the bias of the negative direction.

As shown in FIG. 7B, when the input wave shifts in the minus direction as a result of the operating point drift, the input wave and the signal in phase are detected in the optical coupler 30. The comparison of step S7 is performed, and the result of the determination of step S8 is affirmative.

Contrary to the above-mentioned case, as shown in the waveform chart of the lower part of FIG. 7C, from the phase comparator 53, the wave which carried out half wave rectification in the negative direction conversely is outputted.

Consequently, it is reversed by each of the amplifiers 54, 55, and 56, respectively, and the bias voltage of the plus direction is applied by the Mach-Zehnder optical modulator 20 from the operating point control circuit 50 (step S9), as indicated by the arrow in FIG. 7B, the operating point is changed in the plus direction. The feedback control is performed so that the operating point is returned to the optimal position as shown in FIG. 6A.

In addition, both the signals are in the opposite phase by the phase comparator 53 in this case, as a result of multiplying mutually, the wave which always has the amplitude of only the negative direction is outputted, and as a result of equalizing this and carrying out manual reversal, it becomes the bias of the right direction.

Figure 8:
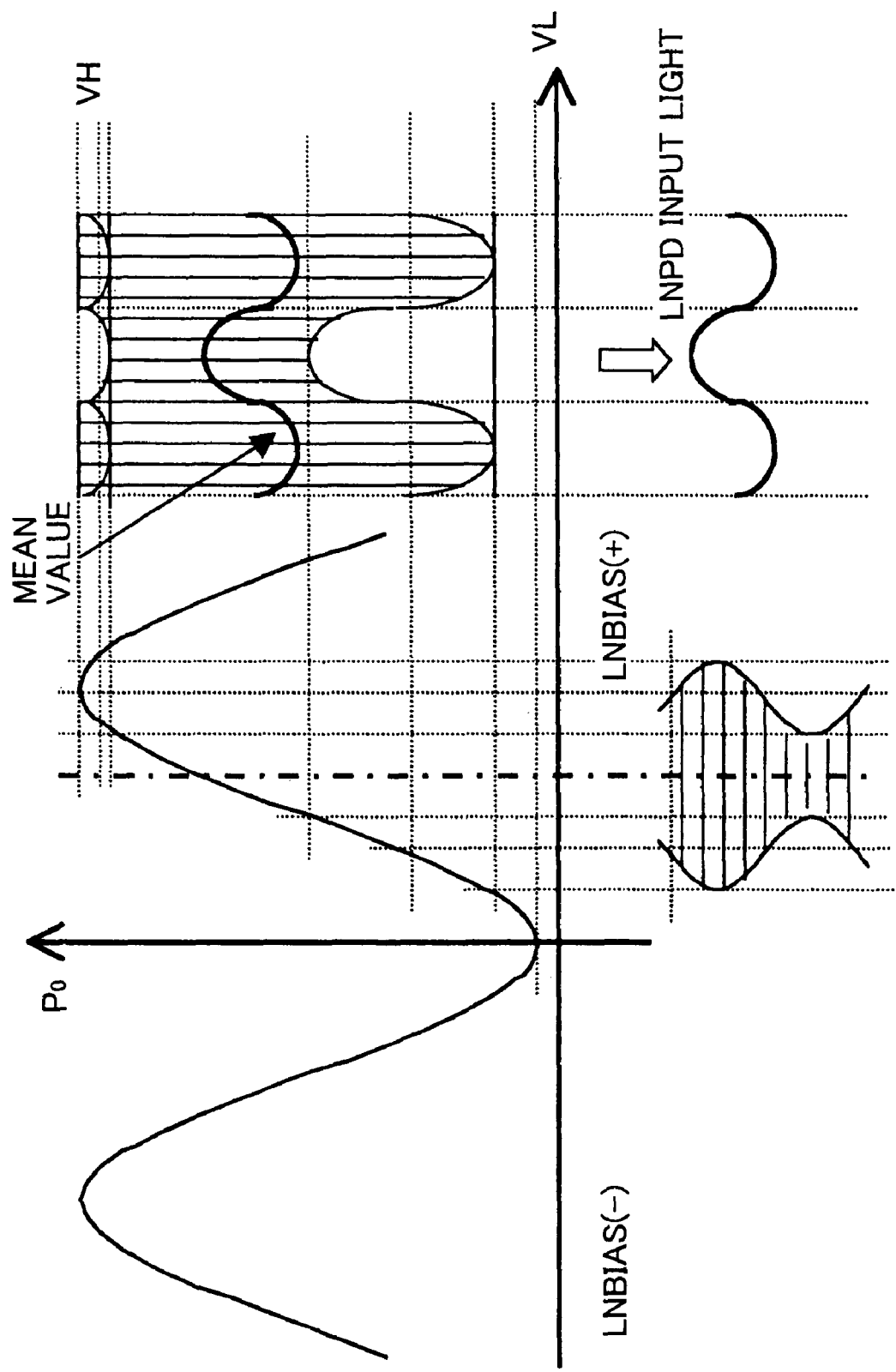
FIG. 8 is a diagram for explaining the operating point control operation of the optical transmitter of the present embodiment.
Figure 9:
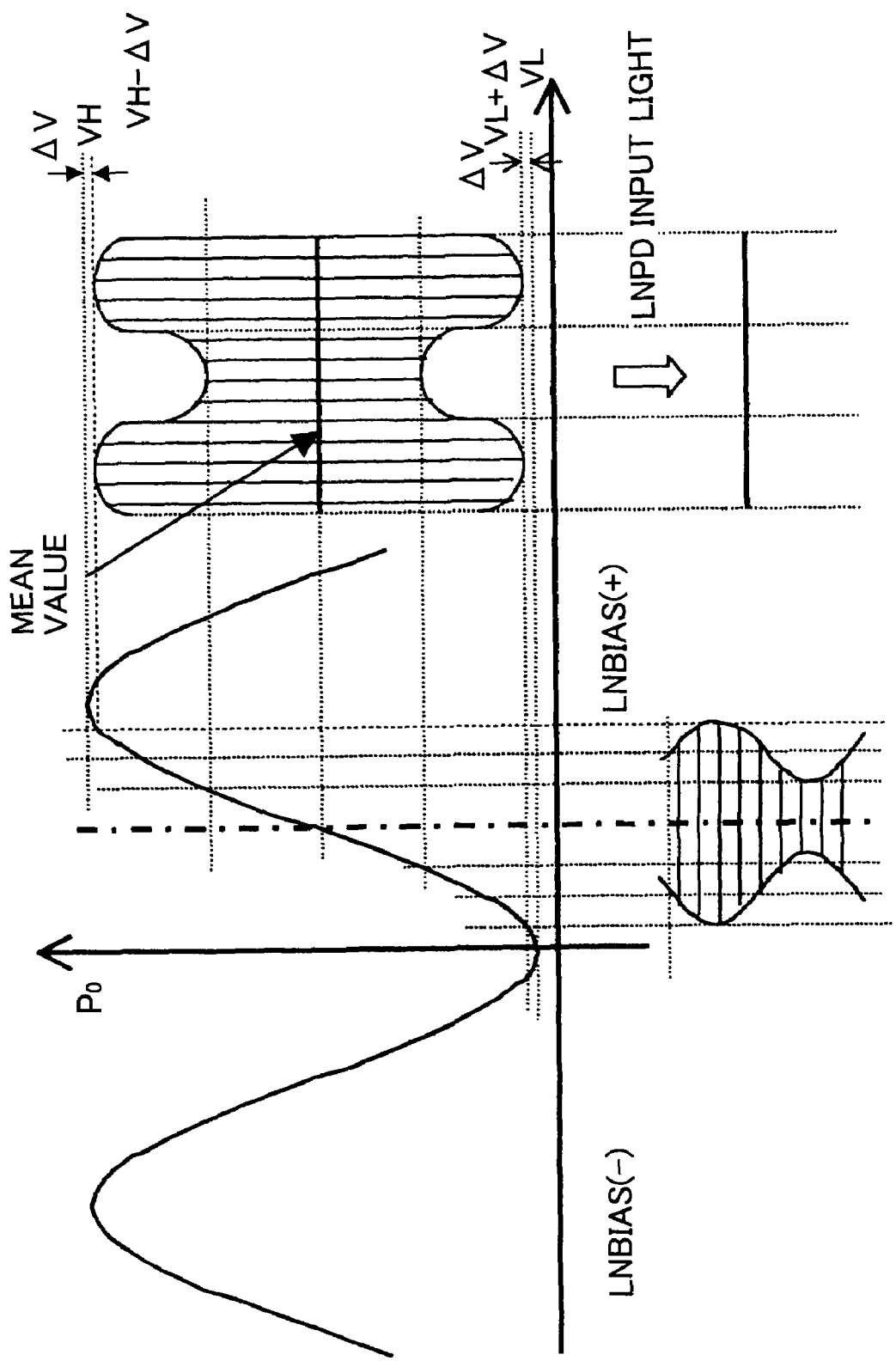
FIG. 9 is a diagram for explaining the operating point control operation of the optical transmitter of the present embodiment.

Concerning the above-described control, when the amplitude of the input signal decreases as shown in FIG. 8 due to temperature changes, secular changes, etc., the control is performed so that the average waveform is applied as described above with FIG. 6A and FIG. 7A, and the optical output signal of the low frequency signal f0 may not be produced. As shown in FIG. 9, it is stabilized at the bias point where the upper and lower amplitudes of the optical output signal waveform derived from the upper and lower amplitudes of the input signal waveform are canceled each other. The component of the low frequency signal of f0 is lost, and the optical output signal is set in the flat waveform.

In this case, the extinction ratio in the waveform of the output optical signal deteriorates as in the following.

Namely, the extinction ratio in the state before degradation (for example, the state of FIG. 6A), or the state where the full range between the top (peak) and the bottom (valley) of the modulation-characteristic curve of the modulator 20 can be used, is represented by the following formula.

$$EX = 10 \times \log VH/VL [dB]$$

However, the extinction ratio in the state after degradation (for example, the state of FIG. 9) is represented by the following formula.

$$EXd = 10 \times \log (VH - \Delta V)/(VL + \Delta V) [dB]$$

Hence, it is apparent that the condition: EXd<EX is met.

Thus, if the drive amplitude is fluctuated due to temperature changes, secular changes, etc., the extinction ratio deteriorates, which will cause undesired influences on the transmission characteristics.

Therefore, in the first preferred embodiment, the control operation is performed so that the extinction ratio is always kept at the maximum level.

A description will now be given of the control operation of the first preferred embodiment of the present invention with reference to FIG. 10 through FIG. 12B.

Figure 10:
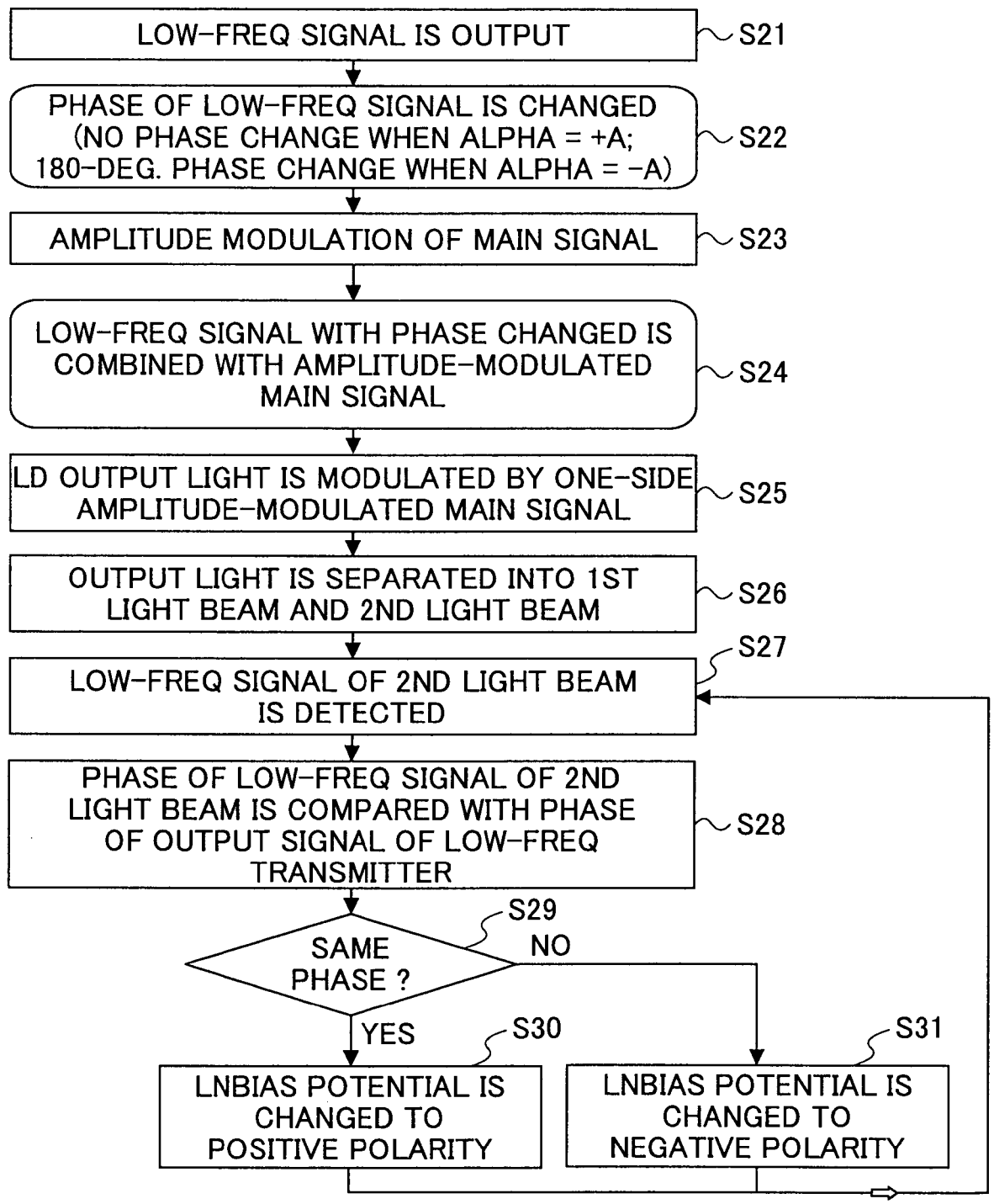
FIG. 10 is a flowchart for explaining another operating point control operation of the optical transmitter of the present embodiment.

In FIG. 10, the steps S21, S22, S23, S26, S27, S28, S29, S30, and S31 are essentially the same as the steps S1, S2, S3, S5, S6, S7, S8, S9, and S10 in the flowchart of FIG. 5, respectively, and a description thereof will be omitted.

In the control operation of FIG. 10, at step S24, the low frequency superimposing control circuit 70 of FIG. 4 is caused to control the superimposing processing so that the amplitude-modulated transmission signal is combined with the phase-changed low-frequency signal. More specifically, when the alpha value is positive, the low frequency signal having the same frequency f0 and in phase with the low frequency signal generated by the low frequency transmitter 60 is superimposed on the transmission signal. On the other hand, when the alpha value is negative, the low frequency signal having the same frequency f0 and 180 degrees out of phase with the low frequency signal generated by the low frequency transmitter 60 is superimposed on the transmission signal.

As shown in FIG. 11A, when the alpha is positive, a part for the amplitude modulation of the top of the input wave is canceled, and the single-sided amplitude-modulation waveform including only a part for the amplitude modulation of the valley portion is obtained.

Furthermore, at step S25, the input signal obtained by the superimposing processing of step S24 where the single-sided modulation is carried out is applied to the Mach-Zehnder optical modulator 20, and the incoming light is modulated according to the predetermined modulation-characteristic curve of the optical modulator 20.

FIG. 11A and FIG. 11B show the waveform of the optical output signal before the control operation of FIG. 10 is performed when the input signal amplitude is decreased to be smaller than Vπ indicated in FIG. 3. FIG. 12A and FIG. 12B shows the waveform of the optical output signal after the control operation of FIG. 10 is performed in that state.

FIG. 11A shows the case in which the alpha indicated by the alpha-switch signal is +1 (α=+1). As shown in the lower part of FIG. 11A, the superimposing processing of step S24 is performed, so that the signal having the frequency f0 and 180 degrees out of phase with the phase of the low frequency signal of f0 is superimposed on the transmission signal by the amplitude modulation. A part for the amplitude modulation of the upper part of the transmission signal is canceled, and the waveform in which single-sided amplitude modulation only of the lower part is carried out is obtained.

The optical output signal obtained by applying the bias voltage to the Mach-Zehnder optical modulator 20 at step S26 has the opposite phase to the phase of the low frequency signal of f0 after the amplitude modulation. Hence, the result of the determination of step S29 is negative.

Therefore, similar to the case of FIG. 7A and FIG. 7B, the control operation is performed so that the amplitude of the amplitude modulation portion of the bottom of the input signal becomes small in the optical output signal after light modulation.

The operating point where the input signal wave is applied to the modulation-characteristic curve is changed in the minus direction (step S31), and as shown in FIG. 12A, it is stabilized in the state where the amplitude modulation portion of the lower part of the input signal is applied to the valley portion of the modulation-characteristic wave.

FIG. 11B shows the case the alpha indicated by the alpha-switch signal is −1 (α=−1). As shown in the lower part of FIG. 11B, when the transmission signal in which amplitude modulation is carried out by superimposing processing of step S24, i.e., the signal having the frequency f0 and in phase with the low frequency signal is overlapped on the transmission signal, a part for the amplitude modulation of the lower part of the transmission signal after amplitude modulation is negated, and the waveform in which single-sided amplitude modulation only of the upper part is carried out is obtained.

The optical output signal obtained by applying the bias voltage to the Mach-Zehnder optical modulator 20 at step S26 has the opposite phase to the phase of the low frequency signal of f0 after the amplitude modulation.

Moreover, the phase of the low frequency signal is already reversed at step S22 in this case, and the low frequency signal before reversal and the optical-output wave of the Mach-Zehnder optical modulator 20 are in phase. The result of the determination of step S29 is affirmative.

Therefore, similar to the case of FIG. 7B, the bias control is carried out so that the operating point where the input signal is applied to the modulation-characteristic curve is changed in the plus direction (step S30). Consequently, the control operation is performed so that the amplitude of the amplitude modulation portion of the top of the input signal becomes small in the optical output signal after light modulation.

As a result, it is stabilized at the operating point where the amplitude modulation portion of the upper part of the input signal is applied to the valley portion of the modulation-characteristic curve, as shown in FIG. 12B.

Thus, according to the operating point control of the first preferred embodiment, the bias control is carried out so that the predetermined one-side amplitude of the input signal is applied as the operating point to the valley portion of the modulation-characteristic curve of the Mach-Zehnder optical modulator 20.

Consequently, as shown in FIG. 12A and FIG. 12B, the amplitude of the input signal is applied to the lower portion of the modulation characteristic curve of the optical modulator, and the non-used output-power portion ΔV is left in the upper portion of the modulation characteristic curve.

As described above, the extinction ratio is represented by a value derived from the ratio of the maximum value to the minimum value in the waveform of the optical output signal of the optical modulator, and rather than the variation of the numerator, the variation of the denominator more significantly affects the calculation results of the extinction ratio.

Therefore, in order to improve the extinction ratio, it is effective to bring the lower side of the optical-output waveform near the lower-limit portion of Vπ, i.e., the valley portion of the modulation characteristic curve. As shown in FIG. 11A and FIG. 11B, it is attained by performing the superimposing of the low frequency signal to only the one-side amplitude of the input signal that is supplied to the Mach-Zehnder optical modulator 20.

Next, a description will be given of the second preferred embodiment of the present invention with reference to FIG. 13, FIG. 14, and FIG. 15.

In the optical transmitter of the present embodiment, when the transmission signal (the main signal) externally supplied from the outside is in OFF state, the optical output of the Mach-Zehnder optical modulator 20 in operation is turned off without setting the light source 10 in OFF state. Hereinafter, this operation of the present embodiment will be called a shutdown operation.

Figure 13:
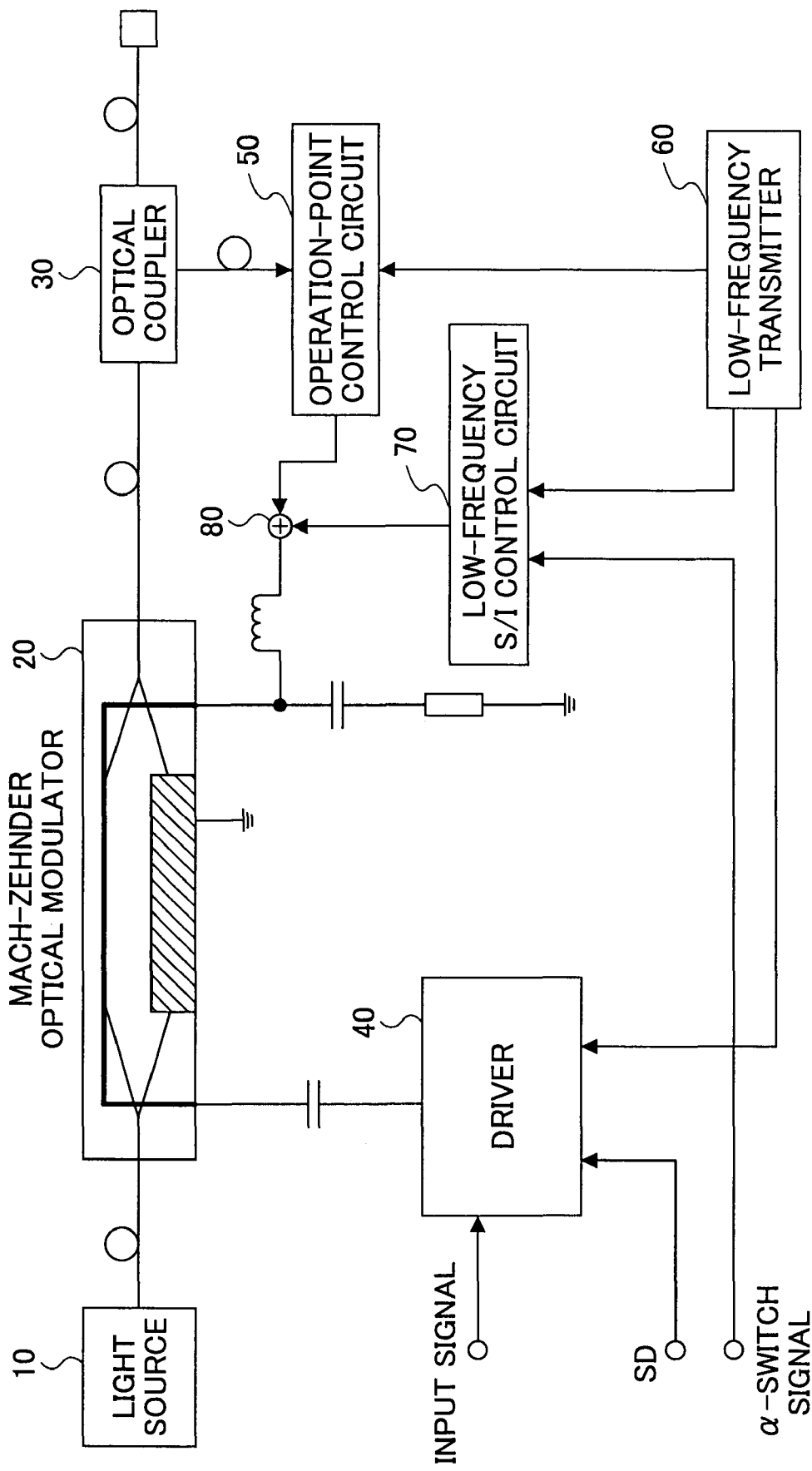
FIG. 13 is a block diagram of an optical transmitter in the second preferred embodiment of the present invention.

FIG. 13 shows the composition of the optical transmitter in the second preferred embodiment of the present invention.

In FIG. 13, the elements that are essentially the same as corresponding elements in FIG. 4 are designated by the same reference numerals, and a description thereof will be omitted.

In addition, as shown in FIG. 13, the second preferred embodiment has essentially the same composition as the first preferred embodiment, and the above-described operation of the present embodiment can be also realized using the composition of the first preferred embodiment. However, in the second preferred embodiment, the signal of the opposite phase of the signal of this low frequency f0 is always superimposed after amplitude modulation by the signal of low frequency f0 to the input signal to the Mach-Zehnder optical modulator 20, which will be described later. Therefore, the present embodiment corresponds to the case of FIG. 11A in which the alpha-switch signal is set to be positive.

Figure 14:
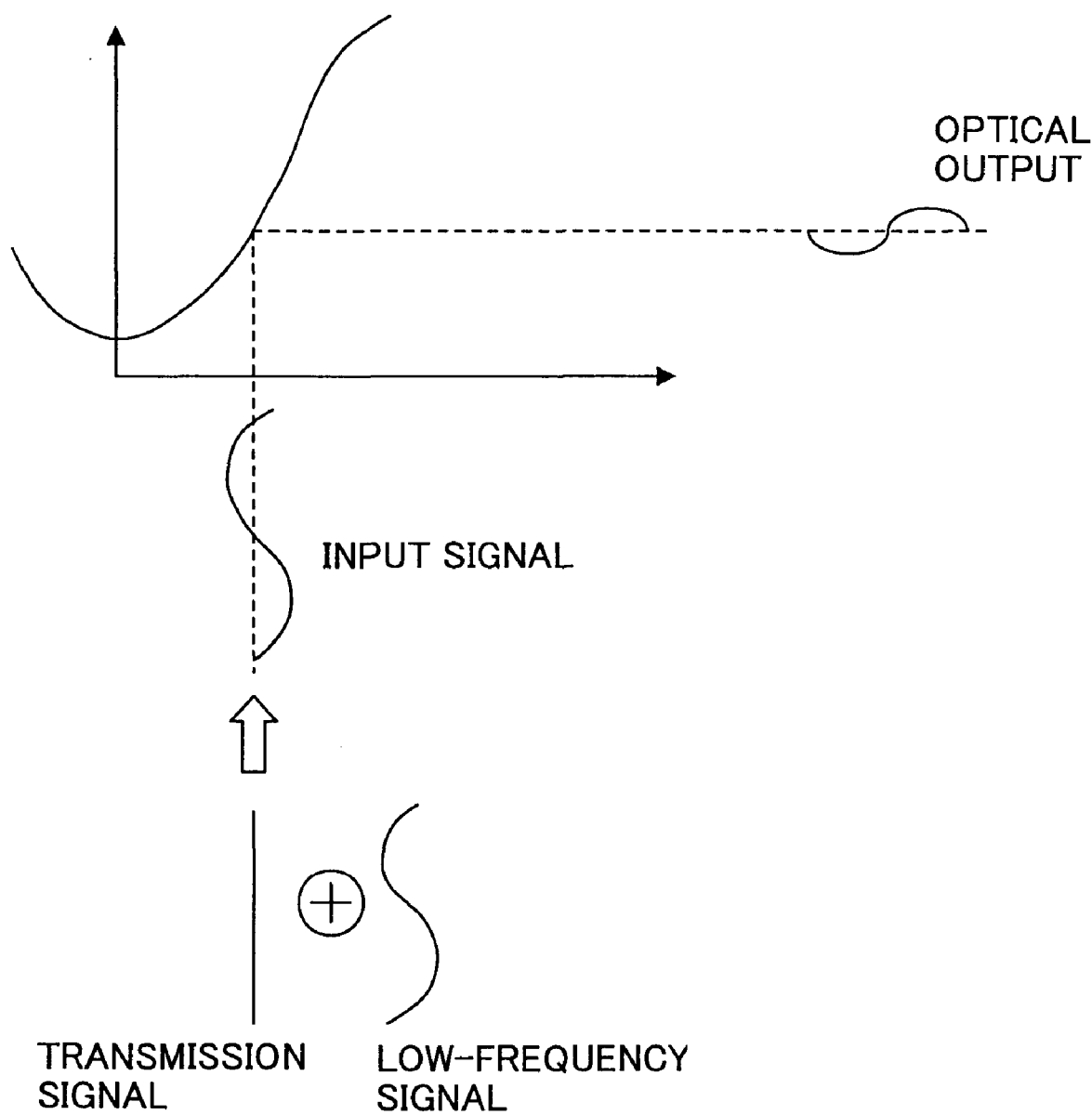
FIG. 14 is a diagram for explaining a shutdown operation of the optical transmitter of the present embodiment.
Figure 15:
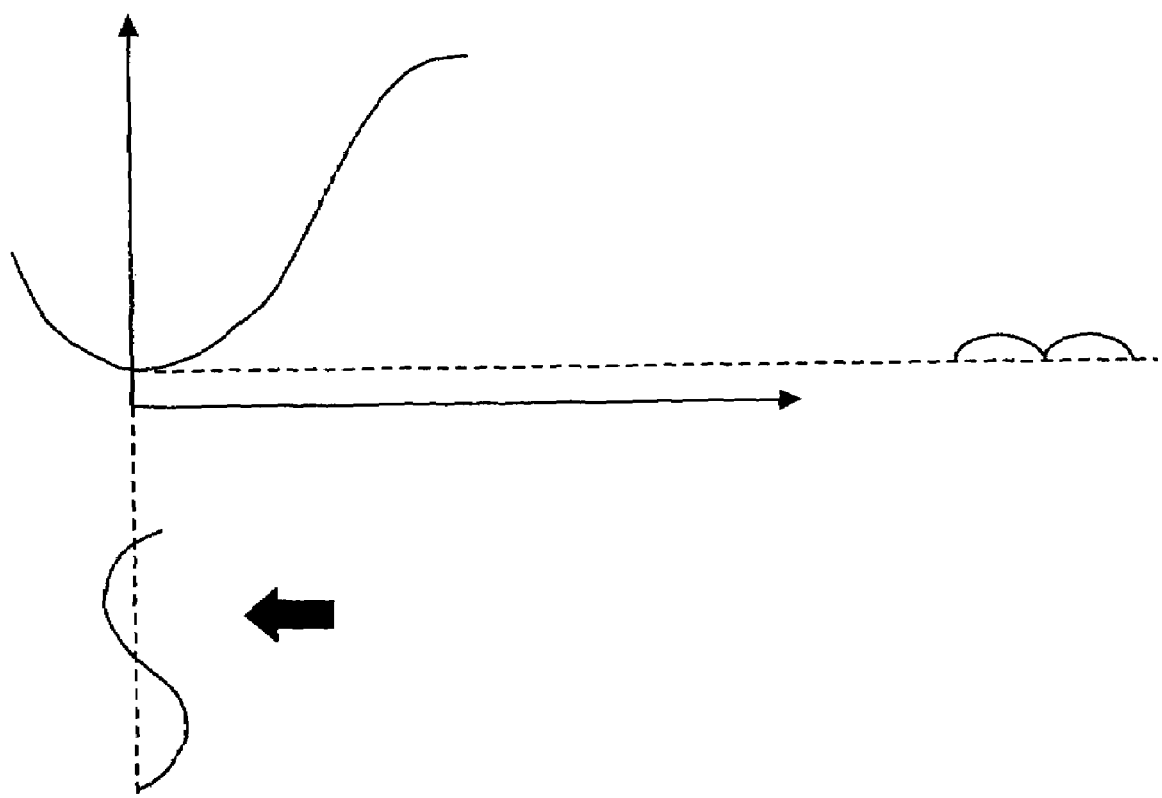
FIG. 15 is a diagram for explaining a shutdown operation of the optical transmitter of the present invention.

FIG. 14 and FIG. 15 are diagrams for explaining a shutdown operation of the optical transmitter of the present embodiment.

Suppose the case in which a shutdown signal SD is inputted to the driver circuit 40 in the optical transmitter of FIG. 13 so that the amplitude of the transmission signal is set to zero as shown in the lower portion of FIG. 14.

Similar to the previous embodiment, in the optical transmitter of the present embodiment, the amplitude modulation of the transmission signal with the low frequency signal of f0 from the low-frequency transmitter 60 is performed. Control of the low-frequency superimposing control circuit 70 is performed so that a signal having the frequency f0 and 180 degrees out of phase with the low-frequency signal is superimposed on the amplitude-modulated transmission signal. The thus obtained input signal is supplied to the Mach-Zehnder optical modulator 20.

In this case, the transmission signal is in OFF state and does not contain the signal components of high frequencies above 40 kHz as in the previous embodiment. As shown in FIG. 14, the input signal supplied to the Mach-Zehnder optical modulator 20 contains only the low-frequency components of f0.

Consequently, as shown in the upper portion of FIG. 14, the optical output signal of the opposite phase is obtained at the output of the optical modulator 20 with the low-frequency signal. Hence, the result of the determination of step S29 in FIG. 10 is negative.

Therefore, similar to the case of FIG. 11A of the first preferred embodiment, the predetermined bias voltage is applied to the optical modulator 20 by the operating point control operation, so that the operating point where the input signal waveform is applied to the light modulation characteristic curve is changed in the minus direction as shown in FIG. 15. The amplitude modulation portion (i.e., the input signal waveform itself) of the input signal is stabilized at the operating point where the input signal is applied to the valley portion of the light modulation characteristic curve.

Consequently, as shown in FIG. 15, the optical output signal is stabilized in the state near zero. The optical output signal of the Mach-Zehnder optical modulator 20 will be in OFF state substantially.

Thus, in the present embodiment, the optical transmitter has a comparatively simple composition, and when the main signal is in OFF state, it is possible to automatically set the optical output signal of the Mach-Zehnder optical modulator 20 in OFF state without setting the light source 10 in OFF state.

Accordingly, in the present invention, even when the amplitude of the transmission signal fluctuates due to temperature or power changes or secular changes, it is possible to always make the extinction ratio to the maximum, and the stabilization of optical-transmission characteristics is possible with the use of a comparatively simple composition.

Although it is in the tendency that the amplitude of the input signal to the optical modulator which is the output of the driver circuit decreases when the transmission rate becomes very high, according to the present invention, it is possible for the optical transmitter of the present invention to always keep the extinction ratio the optimal.

According to the optical transmitter of the present invention, only a one-side amplitude of the input signal to the optical modulator is taken as being the signal portion where the amplitude modulation is carried out, and the level of the input signal applied to the modulation-characteristic curve is controlled so that the single side of the amplitude of the input signal concerned may be applied to the minimum portion of the modulation-characteristic curve of the optical modulator.

Consequently, even when the amplitude of the input signal to the optical modulator is decreased due to a certain factor, the optical transmitter of the present invention makes effective use of the minimum portion of the modulation-characteristic curve, and it is possible to maximize the extinction ratio under the given conditions.

The present invention is not limited to the above-described embodiments, and variations and modifications may be made without departing from the scope of the present invention.

What is claimed is:

1. An optical transmitter comprising:
an amplitude modulation unit performing amplitude modulation of only a one-side amplitude of a main signal with a low-frequency signal having a predetermined frequency;
an optical modulator receiving an input signal generated by the amplitude modulation unit after the one-side amplitude modulation, and modulating an incoming light in response to the received signal in accordance with a predetermined modulation-characteristic curve to output an optical output signal; and
an operating point control unit applying a predetermined bias voltage to the optical modulator to control a level of the input signal substantially applied to the modulation-characteristic curve so that the one-side amplitude of the main signal is applied to a minimum portion of the modulation-characteristic curve of the optical modulator; wherein
the amplitude modulation unit superimposes a signal, having the predetermined frequency in phase or 180 degrees out of phase with the low-frequency signal, on the input signal generated after the one-side amplitude modulation, so that an opposite-side amplitude of the main signal is canceled.

2. The optical transmitter of claim 1 wherein the amplitude modulation unit is provided to perform amplitude modulation of only a valley portion in a waveform of the input signal when the input signal to the optical modulator is applied to an upward slope portion of the modulation-characteristic curve, and perform amplitude modulation of only a peak portion in the waveform of the input signal when the input signal to the optical modulator is applied to a downward slope portion of the modulation-characteristic curve.

3. The optical transmitter of claim 1 wherein the operating point control unit comprises a phase comparator which compares a phase of the optical output signal of the optical modulator with a phase of the low-frequency signal, and the bias voltage applied to the optical modulator by the operating point control unit is changed to a different polarity depending on whether the two signals are in phase or 180 degrees out of phase.

4. The optical transmitter of claim 1 wherein the optical transmitter comprises a Mach-Zehnder optical modulator.

5. An optical transmitter comprising:
an amplitude modulation unit performing amplitude modulation of a main signal with a low-frequency signal having a predetermined frequency;
an optical modulator receiving an input signal generated by the amplitude modulation unit after the amplitude modulation, and modulating an incoming light in response to the received signal in accordance with a predetermined modulation-characteristic curve to output an optical output signal; and
an operating point control unit applying a predetermined bias voltage to the optical modulator to control a level of the input signal substantially applied to the modulation-characteristic curve of the optical modulator, so that the input signal generated after the amplitude modulation is applied to a minimum portion of the modulation-characteristic curve when the main signal is in OFF state, the operating point control unit comprising a phase comparator which compares a phase of the optical output signal of the optical modulator with a phase of the low-frequency signal, and the bias voltage applied to the optical modulator by the operating point control unit is changed to a different polarity depending on whether the two signals are in phase or 180 degrees out of phase.

6. The optical transmitter of claim 5 wherein the optical transmitter comprises a Mach-Zehnder optical modulator.

7. A control method of an optical transmitter provided with an optical modulator, comprising:
    performing amplitude modulation of only a one-side amplitude of a main signal with a low-frequency signal having a predetermined frequency;
    causing the optical modulator to receive an input signal generated after the one-side amplitude modulation, and modulate an incoming light in response to the received signal in accordance with a predetermined modulation-characteristic curve to output an optical output signal;
    applying a predetermined bias voltage to the optical modulator to control a level of the input signal substantially applied to the modulation-characteristic curve so that the one-side amplitude of the main signal is applied to a minimum portion of the modulation-characteristic curve of the optical modulator; and
    the amplitude modulation superimposes a signal, having the predetermined frequency in phase or 180 degrees out of phase with the low-frequency signal, on the input signal generated after the one-side amplitude modulation, so that an opposite-side amplitude of the main signal is canceled.

8. The control method of claim 7 wherein the amplitude modulation is provided to perform amplitude modulation of only a valley portion in a waveform of the input signal when the input signal to the optical modulator is applied to an upward slope portion of the modulation-characteristic curve, and perform amplitude modulation of only a peak portion in the waveform of the input signal when the input signal to the optical modulator is applied to a downward slope portion of the modulation-characteristic curve.

9. The control method of claim 7 wherein the optical transmitter comprises a phase comparator which compares a phase of the optical output signal of the optical modulator with a phase of the low-frequency signal, and the bias voltage applied to the optical modulator is changed to a different polarity depending on whether the two signals are in phase or 180 degrees out of phase.

10. The control method of claim 7 wherein the optical transmitter comprises a Mach-Zehnder optical modulator.

11. A control method of an optical transmitter provided with an optical modulator, comprising:
    performing amplitude modulation of a main signal with a low-frequency signal having a predetermined frequency;
    causing the optical modulator to receive an input signal generated after the amplitude modulation, and modulate an incoming light in response to the received signal in accordance with a predetermined modulation-characteristic curve to output an optical output signal; and
    applying a predetermined bias voltage to the optical modulator to control a level of the input signal substantially applied to the modulation-characteristic curve of the optical modulator, so that the input signal generated after the amplitude modulation is applied to a minimum portion of the modulation-characteristic curve when the main signal is in OFF state; wherein
    the optical transmitter comprises a phase comparator which compares a phase of the optical output signal of the optical modulator with a phase of the low-frequency signal, and the bias voltage applied to the optical modulator is changed to a different polarity depending on whether the two signals are in phase or 180 degrees out of phase.

12. The control method of claim 11 wherein the optical transmitter comprises a Mach-Zehnder optical modulator.

* * * * *